United States Patent [19]
Luthi

[11] Patent Number: 5,243,521
[45] Date of Patent: Sep. 7, 1993

[54] WIDTH DETERMINATION OF FRACTURES INTERSECTING A BOREHOLE

[75] Inventor: Stefan Luthi, Ridgefield, Conn.

[73] Assignee: Schlumberger Technology Corporation, New York, N.Y.

[21] Appl. No.: 587,465

[22] Filed: Sep. 19, 1990

Related U.S. Application Data

[63] Continuation of Ser. No. 252,958, Oct. 3, 1988, abandoned.

[51] Int. Cl.$^5$ .............................................. G01V 3/00
[52] U.S. Cl. .................................................. 364/422
[58] Field of Search ..................... 364/422; 324/347; 367/29, 35

[56] References Cited

U.S. PATENT DOCUMENTS

| | | | |
|---|---|---|---|
| 4,575,828 | 3/1986 | Williams | 367/31 |
| 4,641,724 | 2/1987 | Chow et al. | 376/28 X |
| 4,791,619 | 12/1988 | Liu | 367/35 |

OTHER PUBLICATIONS

S. Crary, et al., *Fracture Detection with Logs*, The Technical Review, Jan. 1987, pp. 22–34.

*Primary Examiner*—Roy N. Envall, Jr.
*Assistant Examiner*—David Huntley
*Attorney, Agent, or Firm*—Leonard W. Pojunas

[57] ABSTRACT

The present invention is directed to utilizing data indicative of formation resistivity and calculating the width and depth of a fracture therefrom. In the preferred embodiment, the present invention employs data acquired from a formation microscanner tool. Potential fracture locations are detected for acquired formation microscanner tool data preferably by taking into account the relatively slowly varying conductivity changes in the rock matrix, and separating them out from the high and narrow peaks generated by fractures. Each potential fracture location can be depicted as current from the formation microscanner tool versus azimuth, wherein the current measured by the formation microscanner tool is essentially flat for the formation but peaked for potential fracture locations. I have found that the area under the peak, herein referred to as "additional area under the curve, A", is related to the width of each potential fracture location according to the following equation, based on the specific tool parameters:

$$W = 0.2179 \cdot A \cdot R_t^{0.1505} \cdot R_m^{0.8495}.$$

The resistivity values for the formation and mud, $R_t$ and $R_m$, respectively, are typically known values. Thus, by calculating A, preferably by an areal integral, the width of each potential fracture location can be determined. The present invention optionally removes potential fracture locations indicative of spurious and scattered data, thereby obtaining sharper fracture images. Of the locations retained, the width of each fracture location is calculated according to the above equation and plotted as a function of azimuth and depth.

14 Claims, 7 Drawing Sheets

FRACTURE WIDTHS IN mm

ABOVE 1.00
0.80 – 1.00
0.60 – 0.80
0.50 – 0.60
0.40 – 0.50
0.30 – 0.40
0.20 – 0.30
0.15 – 0.20
0.10 – 0.15
0.08 – 0.10
0.06 – 0.08
0.05 – 0.06
0.04 – 0.05
0.03 – 0.04
0.02 – 0.03
0.01 – 0.02
0.01 – 0.01
BELOW 0.01

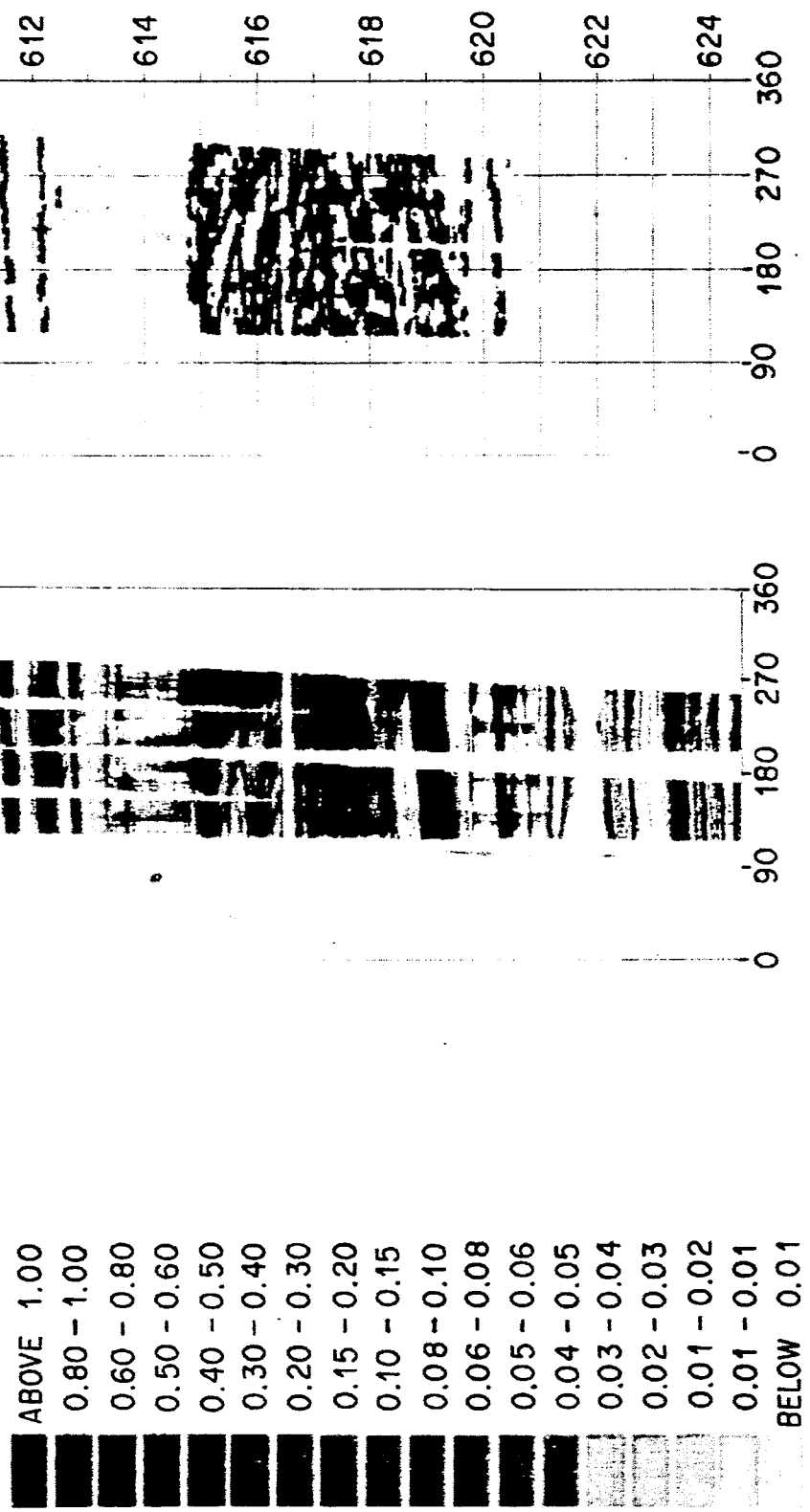

WIDTH DETERMINATION OF FRACTURES INTERSECTING A BOREHOLE

This application is a file wrapper continuation of parent application Ser. No. 252,958, filed Oct. 3, 1988, now abandoned.

BACKGROUND OF THE INVENTION

1. Technical Field

The present invention is directed to determining characteristics of a fracture or crack in a formation which is traversed by a borehole. More particularly, the present method is directed to a method of determining the depth of the fracture, relative to the top of the borehole, as well as the width of the fracture.

Fractures are modelled herein as two parallel planes separated a predetermined distance. Fracture width is defined as the distance of separation between the two parallel planes.

2. Background Information

Methods are known in the art for determining the relative depth and width of fractures which intersect a borehole. For example, in U.S. application Ser. No. 947,946 (now U.S. Pat. No. 4,831,600) entitled "Borehole Logging Method For Fracture Detection and Determination," by Hornby and Johnson, assigned to the same assignee as the present invention, and herein incorporated by reference, employs sonic techniques.

Specifically, a sonic logging sonde having an acoustic source and at least one acoustic detector is deployed in the borehole. The source generates a tube wave, commonly referred to as a Stoneley wave, which propagates through the borehole. Based on the travel time and energy content of the Stoneley wave produced by the acoustic source as received by the detector, the depth and/or width of a fracture which has intersected the borehole can be determined.

In Hornby et al., the acoustic detector is preferably located above the source, relative to the top of the borehole. The Stoneley wave generated by the source travel through the borehole towards the detector, where it is received as a first signal. The signal continues to travel through the borehole where it possible encounters a fracture. The fracture will interfere with the Stoneley wave, absorbing some of the Stoneley wave's energy. The fracture will also appear as a source of the remaining energy, causing the remaining energy to be reflected away from the fracture through the borehole. The energy reflected in the direction of the logging sonde will be received by the detector as a second signal.

The first and second signals are combined so as to be indicative of the depth and/or width of the fracture. In general terms, the time it takes for the second signal to reach the detector is indicative of the distance of the fracture from the detector; the strength of the second signal (where the fracture has interfered) relative to the strength of the first signal (where no fracture has interfered) is indicative of the width of the fracture.

Although the method described by Hornby et al. is an excellent method of determining the relative depth and width of fractures which intersect a borehole, the method identifies fracture width as a single value, based on the average width of the fracture over the borehole azimuth. However, as known by those skilled in the art, fracture width can vary substantially over the borehole wall.

Additionally, Hornby et al. fail to specify either the angle of the fracture, commonly referred to as "dip angle" or its azimuthal direction. As appreciated by those skilled in the art, information directed to azimuth and dip are valuable. For example, more precise production schemes, for example, in which direction to drain the well, can be determined.

SUMMARY OF THE INVENTION

Accordingly, it is an object of the present invention to determine the relative depth and width of a fracture.

It is another object of the present invention to determine the width of a fracture as it varies over the borehole wall.

The present invention is directed to utilizing data indicative of formation resistivity and calculating the width and depth of a fracture therefrom. In the preferred embodiment, the present invention employs data acquired from a formation microscanner tool. The formation microscanner tool acquires data which is indicative of microresistivity variations around the borehole wall.

The acquired data is analysed to determine the potential fracture locations. In the preferred embodiment, fracture detection on formation microscanner tool images is done by taking into account the relatively slowly varying conductivity (the mathematical inverse of resistivity) changes in the rock matrix, and separating them out from the high and narrow peaks generated by potential fracture locations. A statistical procedure in which there is no a priori knowledge of the fracture shape is preferably employed.

Each potential fracture location can be depicted as current from the formation microscanner tool versus azimuth. Depicted in this manner, a graph is obtained wherein the current measured by the formation microscanner tool is essentially flat for the formation but peaked for fracture locations. I have found that the area under the peak, herein referred to as "additional area under the curve, A", is related to the width (in millimeters, mm) of the potential fracture location according to the following equation:

$$W = k \cdot A \cdot R_t^b \cdot R_m^{1-b}$$

The values of k and b are dependent upon the formation microscanner tool parameters. In the preferred embodiment, k is equal to 0.2179, and b is equal to 0.1505.

The resistivity values for the formation and mud, $R_t$ (in ohm.meters) and $R_m$ (in ohm.meters), respectively, are typically known values. Thus, by calculating the additional area under the curve, the width of the potential fracture locations can be determined. The present invention preferably calculates the additional area under the curve by an areal integral.

Based on the values for the additional area under the curve, the present invention preferably removes locations representative of spurious and scattered data from the potential fracture locations, thereby obtaining sharper fracture images. The locations representative of spurious and scattered data are preferably removed by examining each row of potential fracture locations obtained by the formation microscanner tool and retaining only those locations having the maximum value of the additional area under the curve, or its comparable value. Optionally, the locations retained based on their value of A are then tested for "connectivity": only those locations which are connected to at least a predetermined number of other locations along a line of any curvature are retained. In this way, fracture locations are retained which are both high conductivity points as well as associated with a fracture trace.

Of the locations retained, the width of the fracture at each location is calculated according to the above equation and plotted as a function of azimuth and depth.

It is to be noted that the present invention improves the state of the art in several respects. The resolution of the present invention, defined as the smallest distance at which two features can occur and be picked up as two features, is on the order of centimeters. Additionally, the present invention resolves all fractures, including complex fractures, individually, as well as resolving their width variations along each fracture. The prior art, on the other hand, resolves complex fractures as one average width determination.

Additionally, the detection of the present invention, defined as how small a feature can be before it is not detectable by the tool, is on the order of microns.

BRIEF DESCRIPTION OF THE DRAWINGS

FIG. 7A illustrates acquired borehole televiewer data for an intensely fractured zone, plotted as a function of azimuth and depth.

FIG. 7B illustrates the results of the present invention on the data acquired from the formation microscanner tool for the zone illustrated in FIG. 7A.

DESCRIPTION OF THE PREFERRED EMBODIMENT(S)

Figure 1:
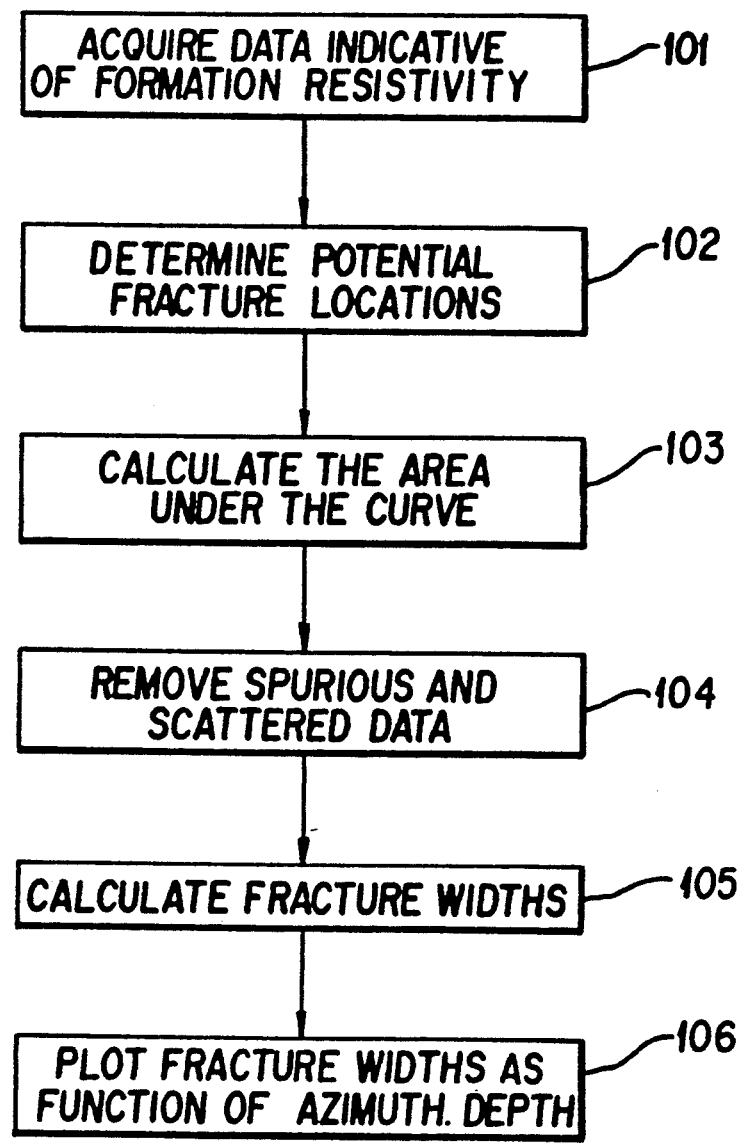
FIG. 1 illustrates the preferred embodiment of the method of the present invention for determining the width of a fracture.

The present invention is directed to utilizing data indicative of formation resistivity and calculating the width of a fracture therefrom. Turning now to FIG. 1, the preferred embodiment of the method of the present invention for determining the width of a fracture is described.

At step 101, data indicative of formation resistivity is acquired. Many methods are known for acquiring data indicative of resistivity. In the preferred embodiment, the present invention employs data acquired from a formation microscanner tool.

The formation microscanner tool acquires data which is indicative of microresistivity variations around the borehole wall. A complete technical description of the formation microscanner tool and service can be found in Ekstrom et al., "Formation Imaging with Microelectrical Scanning Arrays," The Log Analyst, Vol. 28, No. 3, pps. 294–306, U.S. Pat. No. 4,468,623 issued to Gianzero and assigned to the same assignee as the present invention, and "Formation MicroScanner Service" brochure, Schlumberger, 1986. These three references are herein incorporated by reference.

The formation microscanner tool preferably comprises at least two pads, each pad having a plurality of contact points, commonly referred to as buttons, extending therefrom. The pads substantially contact a portion of the borehole wall, the distance between the pad and the borehole wall commonly referred to as standoff. Each pad has an equipotential surface, held at a constant potential relative to a return electrode located in an upper section of the borehole. The pads inject current into the formation. The current density across the pad is indicative of local resistivity variations in front of the pad. By sampling this current distribution, a characterization of the formation microresistivity over the borehole surface is directly obtained.

In the formation microscanner tool, the sampling is achieved by the plurality of buttons. The buttons are arranged in an array of several rows and columns which are azimuthally distributed across the pad surface. Each button is electrically isolated from the pad, as well as each other, and held at the same potential as the pad. The current which each button detects is an integral of the current density over its individual surface region, the spatial resolution of which is determined by the electrode shape and size. Lateral sampling of the current density is obtained by the azimuthal distribution of the button array, relative to a predetermined reference direction. Vertical sampling is obtained by temporal measurement of the array as the tool is pulled through the borehole.

As the tool includes a position-orientation device which records the data acquisition relative to a predetermined reference direction, a plurality of tool runs may be made, the data thereby acquired being properly positioned according to azimuth. In the present invention, it is preferably that data from a large azimuth range is acquired, enabling a more complete depiction of the fracture a transversed by the borehole. As the pad on the formation microscanner tool is small, relative to the circumference of the borehole, it is preferable that the formation microscanner tool is run at least a plurality of times to acquire data employed by the method of the present invention.

Figure 2:
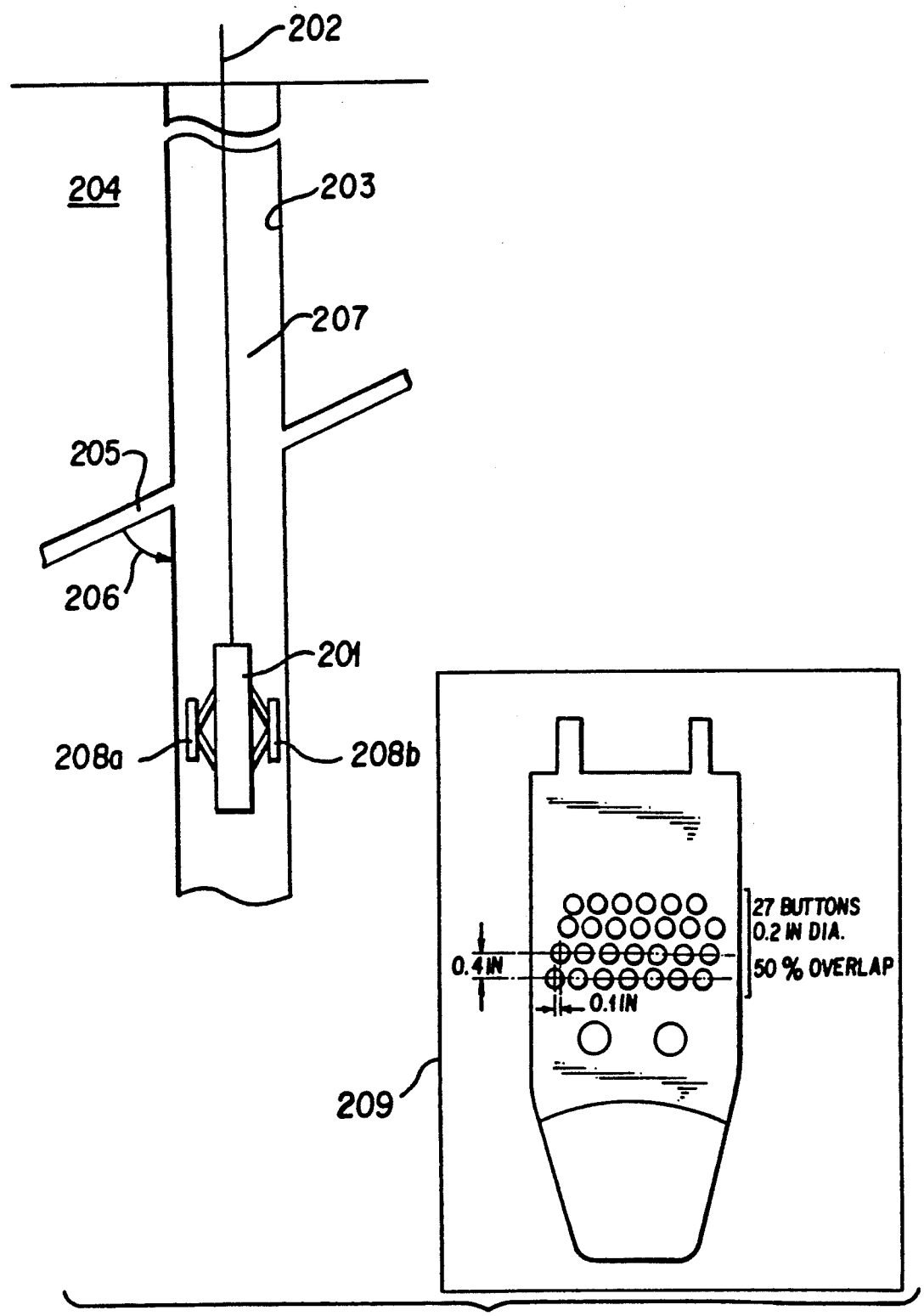
FIG. 2 illustrates a typical formation microscanner tool logging operation.

As shown in FIG. 2, a typical formation microscanner logging operation is illustrated. Formation microscanner tool 201 is suspended from armored cable 202 by which the tool travels through borehole 203 traversing formation 204. Armored cable 202 further acts to transmit data from the tool to the surface, where it is preferably analyzed by surface equipment (not shown) located either at the site or remotely. The borehole intersects fracture 205 which has dip angle 206. As appreciated by those skilled in the art, uncased boreholes typically contain fluid 207, such as mud, also permeating fracture 205. The resistivity of the formation, $R_t$, is typically greater than the resistivity of the mud, $R_m$. Thus, the conductivity (the mathematical inverse of resistivity) of the formation is typically smaller than that of mud. Formation microscanner tool 201 is preferably pulled through the borehole, commencing at the bottom.

Figure 3:
FIG. 3 illustrate data acquired from the formation microscanner tool, depicted as a grey-scale image such that relatively higher conductance areas are illustrated as relatively darker grey-scale tones.

The data acquired from formation microscanner tool pads 208a and 208b is two-dimensional, conductance of the formation at a specified depth over a given azimuth. The preferred button configuration for each pad is shown at 209. An example of acquired formation microscanner data from two tool runs in the same borehole is shown with reference to FIG. 3, wherein the data is depicted as a grey-scale image such that relatively higher conductance areas are illustrated as relatively darker grey-scale tones.

At step 102, the acquired data is analysed to determined the location of a potential fracture locations. In the preferred embodiment, fracture detection on formation microscanner images is done by taking into account the relatively slowly varying conductivity changes in the rock matrix, and separating them out from the high and narrow peaks generated by fractures. A statistical procedure in which there is no a priori knowledge of the fracture shape is preferably employed. This statistical procedure is preferably employed, since in most rocks where fractures are essential for production there is a good conductivity contrast between the rock matrix and the fluid in the fracture.

The method of determining potential fracture locations preferably comprises computing a running median of the rock conductance $I_b/V_e$ over all buttons in three consecutive rows of the formation microscanner tool image. Locations on the center row for which the measurement exceeds the median by a predetermined number of standard deviations are retained. In the preferred embodiment, one standard deviation above a 35%-median passage is employed. This step, in essence, filters out a high-frequency "fracture image" from a low-frequency background or "matrix" image.

Figure 4:
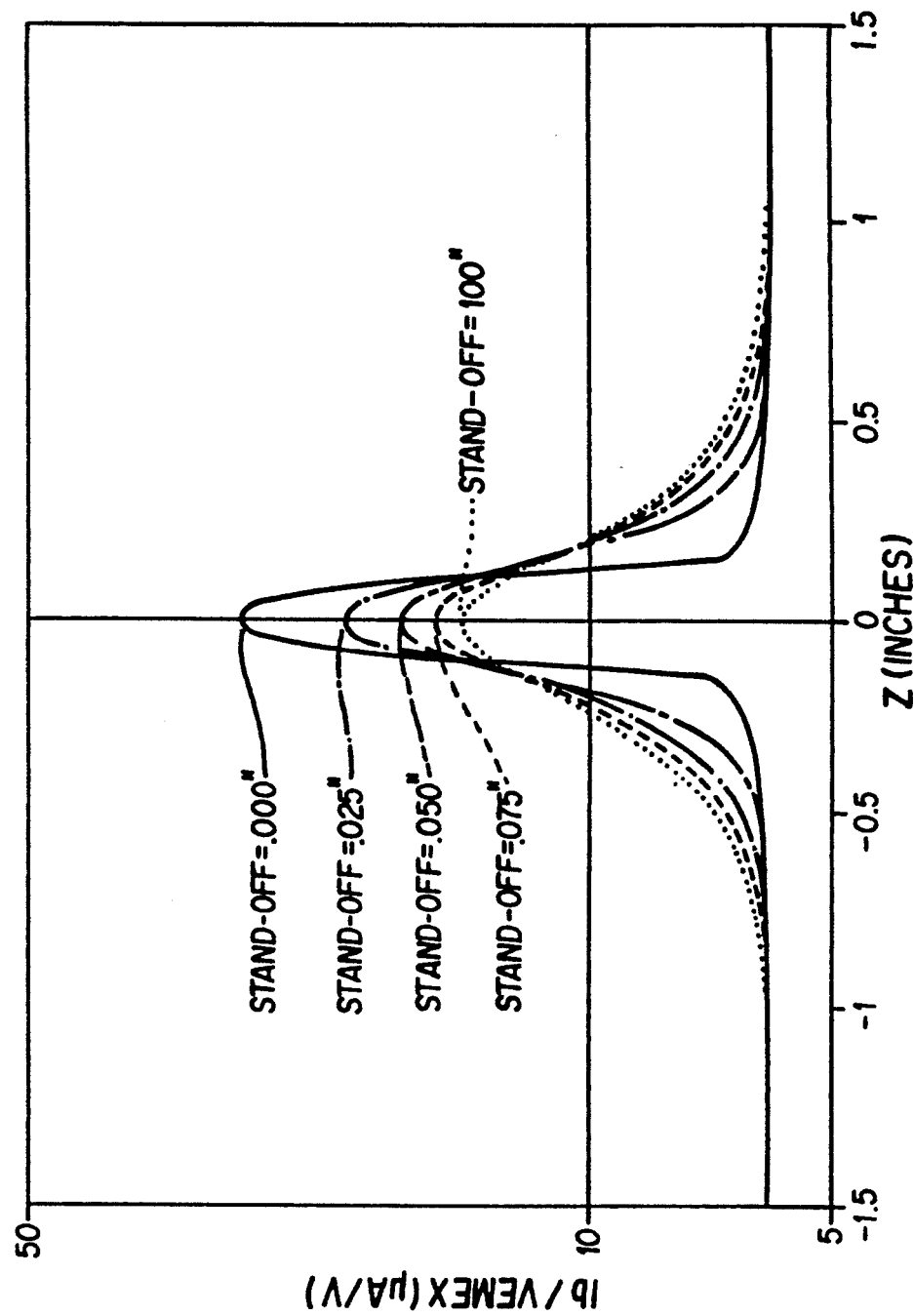
FIG. 4 illustrates button conductance versus depth, acquired from the formation microscanner tool, for a plurality of formation microscanner tool standoffs at a given fracture location.

The result of step 102 is an array of sparsely sampled points which represent potential fracture locations. With reference to FIG. 4, button conductance versus depth for a plurality of tool standoffs is plotted for a given fracture location. The additional area under the curve, on top of that generated by a button in a zone having no fractures, can be expressed mathematically as follows:

$$A = \frac{1}{V_e} \int_{z_0}^{z_n} [I_b(z) - I_{bm}]dz$$

where:
- A represents the additional area under the curve, in $\mu amps \cdot inch/V$;
- $V_e$ represents Emex voltage, in volts, which is the applied voltage to each pad;
- $I_b$ represents the button current, in $\mu amps$, as a function of depth, z, as the tool moves across the fracture, with $z_0$ and $z_n$ representing the first and last depth positions, respectively, at which the measurement is affected by the fracture; and
- $I_{bm}$ represents the button current, in $\mu amps$, in the undisturbed zone, or matrix.

As the stand-off increases, the presence of a fracture is detectable sooner, but the current peak diminishes. The area under the curve remains substantially constant regardless of tool stand-off or fracture dip angles. Thus, the integrated additional area under the curve along the button trajectory is primarily related to formation resistivity $R_t$, mud resistivity, $R_m$, and fracture width, W.

I have found that, given $R_t$ and $R_m$ at a given depth, fracture width W can be calculated by the following equation:

$$W = k \cdot A \cdot R_t^b \cdot R_m^{1-b}.$$

The values of k, and b are dependent upon the formation microscanner tool parameters. In the preferred embodiment, k is equal to 0.2179, and b is equal to 0.1505.

The resistivity values for the formation and mud, $R_t$ and $R_m$, respectively, are typically known values. Accordingly, at step 103, the additional area under the curve A is calculated. As A is defined as a linear integral orthogonally across a fracture, calculating A could be accomplished by the estimation of the local slope, followed by integrating the excess current perpendicularly to the slope of the line. In the preferred embodiment, A is calculated by computing an areal integral of excess current over a circle with radius r centered around the fracture location $(x_0, z_0)$. The circle contains along one of its radial directions the line perpendicular to the fracture. Thus, the areal integral contains the linear integral in addition to a plurality of integrals parallel thereto, which become shorter with increasing distance. The additional area under the curve is calculated according to the following equation:

$$A(x_0, z_0) = \frac{1}{r\sqrt{\pi}} \frac{1}{V_e} \int_{-r}^{+r}\int_{-r}^{+r} (I_b(x,z) - I_{bm})dxdz$$

where $$r = \sqrt{(x - x_0)^2 + (z - z_0)^2}.$$

where
- r represents the radius of the areal integral;
- x represents azimuth; and
- z represents depth.

The radius r is preferably chosen large enough to gather all excessive current at its farthest point from the fracture, but small enough not to interfere with possible adjoining fractures. In the preferred embodiment, a radius of approximately 7.5 mm is employed.

After the potential fracture locations have been determined (step 102) and the additional area under the curve calculated for each potential fracture location (step 103), a considerable amount of potential fracture locations representing spurious and scattered data may be present. Accordingly, at step 104, the potential fracture locations are preferably analyzed to remove those potential fracture locations representative of spurious and scattered data. Although step 104 is not necessary in order to obtain fracture width at each potential fracture location, step 104 is preferably employed for obtaining sharper fracture images.

At step 104, the spurious and scattered data is removed by examining each row of potential fracture locations obtained by the formation microscanner tool and retaining only those locations having the maximum value, or its comparable value, of the additional area under the curve, A. For a row having non-adjacent potential fracture locations, those locations having the highest value, or its comparable value, are retained. For a row having adjacent potential fracture locations, adjacent points are retained if their values of the additional area under the curve are comparable. In the preferred embodiment, values of the additional area under the curve are comparable if their value is at least 95% the maximum value for the row. If, however, there is a clear drop in the magnitude of A, only the location having the highest value is retained. Optionally, the locations retained based on their value of A are then tested for "connectivity": only those locations which are connected to at least a predetermined number of other locations along a line of any curvature are retained. In this way, fracture locations are retained which are both high conductivity points as well as associated with a fracture trace. In the preferred embodiment, the predetermined number of other locations is at least three.

At step 105, the respective widths for each fracture location from step 104 are calculated according to the following equation, as given above:

$$W = k \cdot A \cdot R_t^b \cdot R_m^{1-b}.$$

It is to be noted that the above equation is based on fracture modeling work for fractures having a dip angle between 0 and 40 degrees. Additionally, the model was based on a single isolated fracture in a homogeneous formation.

The above equation can be derived as follows: The integrated additional current along the button trajectory is primarily related to formation resistivity, $R_t$, the resistivity of the fluid, $R_m$, and the fracture width, $W$. This is due to the basic fact that fracture dip angles and tool standoff are of minor importance. From a dimensional analysis, one can plot the quantities $R_t/R_m$ versus $A \cdot R_t W$. For a given $R_t/R_m$, data points acquired from five different tool standoffs aligned very well. The relationship is linear on logarithmic scale and can be approximated by the following equation:

$$\frac{A \cdot R_t}{W} = 4.59 \cdot \left(\frac{R_t}{R_m}\right)^{0.8495}$$

The correlation coefficient of this equation with the plot was 0.99. The coefficient 4.59 has dimensions of length. Solving the above equation for W, k is equal to 0.2179, and b is equal to 0.1505. Thus, as the acquired data is dependent on tool parameters, the values of k and b are also dependent upon the tool parameters.

At step 106, the fracture widths calculated for the fracture locations retained in step 104 can then be plotted as a function of azimuth and depth. Several examples are now discussed with reference to FIGS. 5 through 7.

Figure 5B:
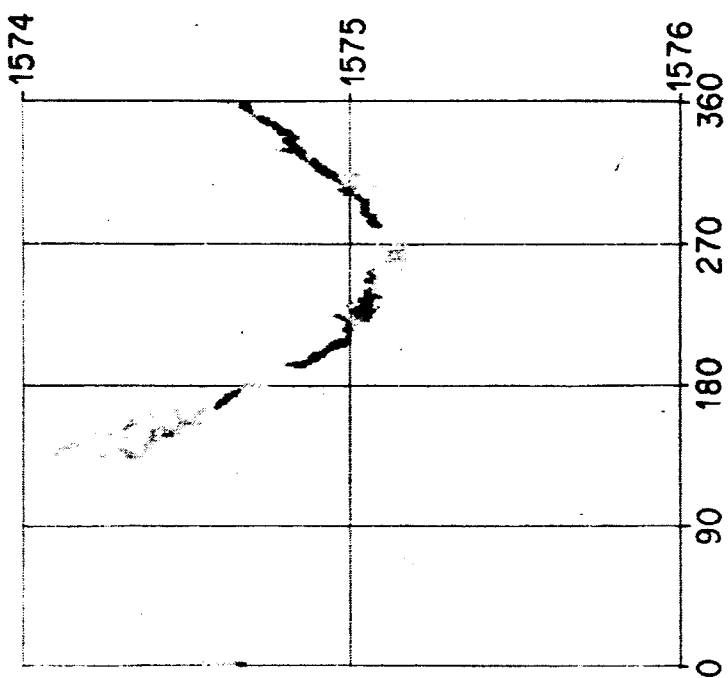
FIG. 5B illustrates the results of the present invention on the data of FIG. 5A.
Figure 5A:
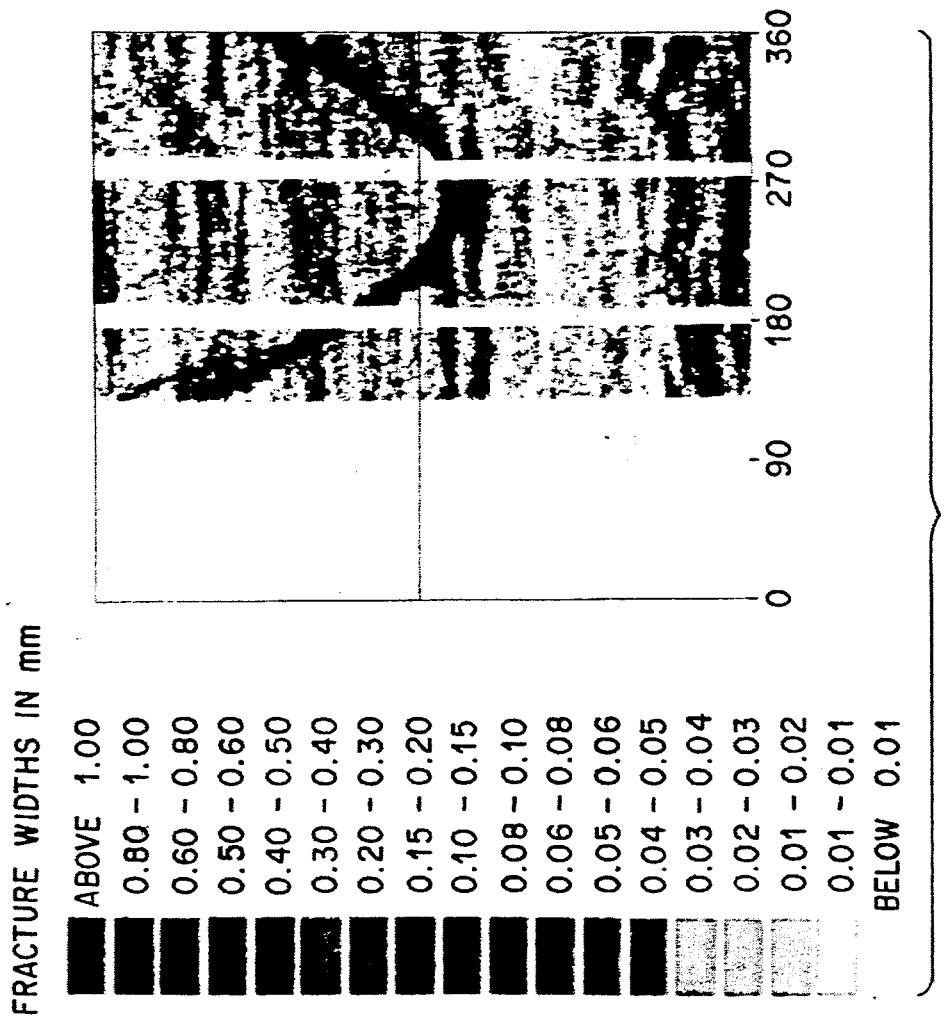
FIG. 5A illustrates the acquired formation microscanner data for a single, thin fracture, plotted as a function of azimuth and depth.

The fracture depicted in FIG. 5 is a single, thin fracture. The acquired formation microscanner tool data for this fracture is illustrated in FIG. 5A, depicted as a grey-scale image such that relatively higher conductance areas are illustrated as relatively darker grey-scale tones. The method of the present invention was applied to this data, the results of which, illustrated in FIG. 5B, are plotted as a function of azimuth and depth. Fracture widths between 0.02 and 0.10 mm were obtained, varying strongly along the trace. Such width variations are not uncommon in natural fractures.

Figure 6B:
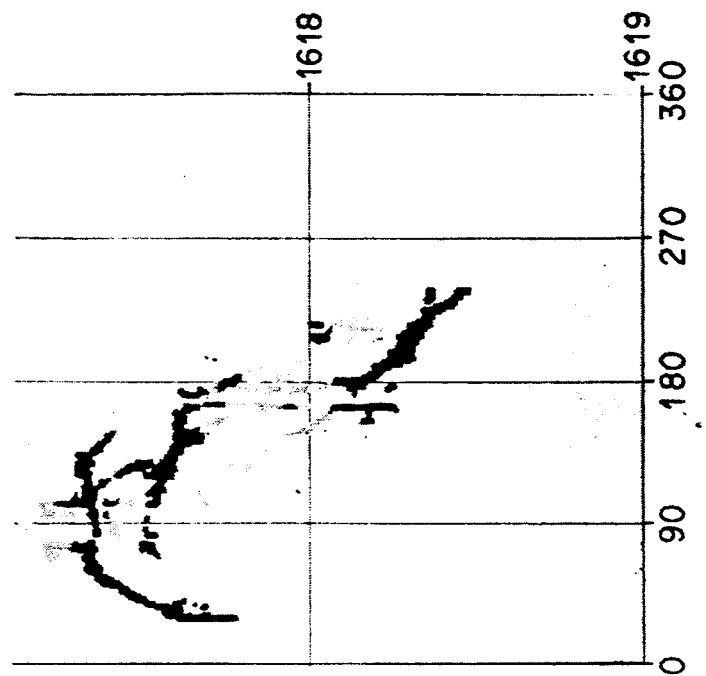
FIG. 6B illustrates the results of the present invention on the data of FIG. 5B.
Figure 6A:
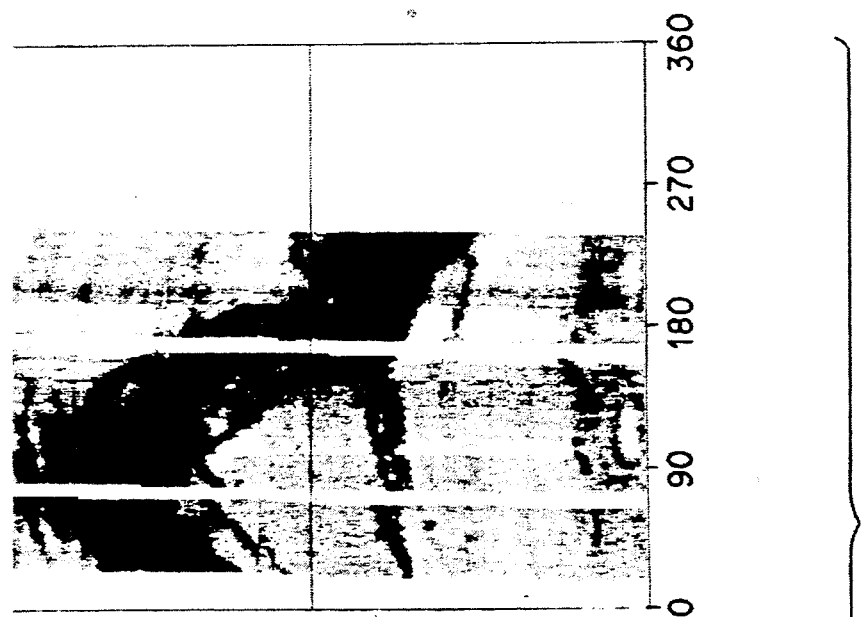
FIG. 6A illustrates the acquired formation microscanner data for complex, intersecting fractures, plotted as a function of azimuth and depth.

FIG. 6 illustrates complex, intersecting fractures. The acquired formation microscanner tool data is illustrated in FIG. 6A. The method of the present invention was applied to this data, the results of which, illustrated in FIG. 6B, are plotted as a function of azimuth and depth. The widths are higher than those of FIG. 5, ranging from 0.03 to 0.30 mm. Higher values (up to 0.05 mm) are shown to occur at the fracture intersections.

FIG. 7 illustrates an intensely fractured zone. The data from this zone was acquired both by the formation microscanner tool as well as an acoustic borehole televiewer, such as described in Broding, "Volumetric Scan Well Logging," The Log Analyst, Jan.-Feb. 1982, pps. 14–19, and herein incorporated by reference. FIG. 7A illustrates the data as acquired from the borehole televiewer. The method of the present invention was applied to data acquired from the formation microscanner tool for the zione illustrated in FIG. 7A. The results of the method of the present invention thereon is illustrated in FIG. 7B, plotted as a function of azimuth and depth. The fractured zone of interest, that containing the concentrated pluralit of fractures, spans a depth of about 5 feet and containing approximately 25 intersecting fractures, their widths ranging from 50 to 800 μm.

The dip angle of each fracture can then be determined. Methods of determining dip angle, given a fracture image, are known in the art. For example, the dip angle can be determined based on the fracture's maximum slope.

It is to be noted that the present invention improves the state of the art in several respects. The resolution of the present invention, defined as the smallest distance at which two features can occur and be picked up as two features, is on the order of centimeters. Additionally, the present invention resolves the all fractures, including complex fractures, individually, as well as resolving their width variations along each fracture. The prior art, on the other hand, resolves complex fractures as one average width determination.

Additionally, the detection of the present invention, defined as how small a feature can be before it is not detectable by the tool, is on the order of microns.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What I claim as my invention is:

1. A method of determining the width of a fracture intersecting a borehole traversing a formation, said method comprising the steps of:
   suspending a logging tool in the borehole;
   injecting current from the logging tool into the formation;
   measuring current density data responsive to the current injected into the formation from the logging tool;
   determining fracture locations based on conductivity changes in the measured data;
   constructing a curve for each of said determined fracture locations representing measured current at each respective location, said curve having a peak associated therewith for each determined fracture location;
   determining additional area under said curve for each determined fracture location;
   determining the width of each determined fracture location based on the determined additional area under the curve; and generating an image that indicates fracture width in light of the determined additional area under the curve.

2. The method of claim 1, said step of determining additional area under said curve for each determined fracture location includes computing an areal integral of excess current over a circle with radius r centered around the fracture location ($x_0$, $z_0$), where x represents azimuth and z represents depth.

3. The method of claim 2, wherein the areal integral is based on the following equation:

$$A(x_0,z_0) = \frac{1}{r\sqrt{\pi}} \cdot \frac{1}{V_e} \int_{-r}^{+r}\int_{-r}^{+r} (I_b(x,z) - I_{bm})dxdz$$

where $$r = \sqrt{(x-x_0)^2 + (z-z_0)^2}$$

and where:
A represents the additional area under said curve, in $\mu$amps.inch/V;
$V_e$ represents Emex voltage, in volts, which is the applied voltage to each pad of the logging tool;
$I_b$ represents button current, in $\mu$amps as a function of depth, z, as the logging tool moves across the fracture; and
$I_{bm}$ represents button current, in $\mu$amps, in the formation.

4. The method of claim 1, wherein the step of determining the width of each determined fracture location is based on the following equation:

$$W = k \cdot A \cdot R_t^b \cdot R_m^{1-b}$$

where:
W represents the width of the fracture;
A represents the additional area under said curve for each determined fracture location;
Rt represents the resistivity of the formation;
Rm represents the resistivity of the fluid in the fracture; and
k, b are constants dependent on the logging tool parameters.

5. The method of claim 4, wherein k is equal to 0.2179, and b is equal to 0.1505.

6. A method of determining the width of a fracture intersecting a borehole traversing a formation, said method comprising the steps of:
suspending a logging tool in the borehole;
injecting current from the logging tool into the formation;
measuring current density data responsive to the current injected into the formation from the logging tool;
determining potential fracture locations based on conductivity changes in the measured data;
constructing a curve for each of said determined fracture locations representing measured current at each respective location, said curve having a peak associated therewith for each determined fracture location;
determining additional area under said curve for each determined fracture location;
removing spurious and scattered data from said determined potential fracture locations based on said determined additional area under the curve, thereby obtaining fracture locations;
determining the width of each determined fracture location based on the determined additional area under the curve; and
generating an image that indicates fracture width in light of the determined additional area under the curve.

7. The method of claim 6, said step of determining additional area under said curve for each determined potential fracture location includes computing an areal integral of excess current over a circle with radius r centered around the fracture location ($x_0$, $z_0$), where x represents azimuth and z represents depth.

8. The method of claim 7, wherein the areal integral is based on the following equation:

$$A(x_0,z_0) = \frac{1}{r\sqrt{\pi}} \cdot \frac{1}{V_e} \int_{-r}^{+r}\int_{-r}^{+r} (I_b(x,z) - I_{bm})dxdz$$

where $$r = \sqrt{(x-x_0)^2 + (z-z_0)^2}$$

and where:
A represents the additional area under said curve, in $\mu$amps.inch/V;
$V_e$ represents Emex voltage, in volts, which is the applied voltage to each pad of the logging tool;
$I_b$ represents button current, in $\mu$amps as a function of depth, z, as the logging tool moves across the fracture, and
$I_{bm}$ represents button current, in $\mu$amps, in the formation.

9. The method of claim 6, wherein the step of determining the width of each obtained fracture location is based on the following equation:

$$W = k \cdot A \cdot R_t^b \cdot R_m^{1-b}$$

where:
W represents the width of the fracture;
A represents the additional area under said curve for each obtained fracture location;
$R_t$ represents the resistivity of the formation;
$R_m$ represents the resistivity of the fluid in the fracture; and
k, b are constants dependent on the logging tool parameters.

10. The method of claim 9, wherein k is equal to 0.2179, and b is equal to 0.1505.

11. The method of claim 6, said step of determining potential fracture locations comprises the steps of:
computing a running median of the formation's conductance over at least a portion of the tool's traversed path; and
retaining locations for which the location measurement of conductance exceeds said median by at least a predetermined amount.

12. The method of claim 6, said step of removing spurious and scattered data from said determined potential fracture locations comprises the steps of:
examining said determined additional area under the curve for at least a portion of said potential fracture locations;

determining the maximum value of said determined additional area under the curve for said portion of potential fracture locations; and retaining said location having said maximum value.

13. The method of claim 12, said step of removing spurious and scattered data from said determined potential fracture locations further comprises the step of:

retaining said locations whose determined additional area under the curve values are comparable to said maximum value.

14. The method of claim 13, wherein determined additional area under the curve values are comparable to said maximum value if their value is at least 95% that of said maximum value.

* * * * *